United States Patent
Paul et al.

(10) Patent No.: US 10,635,968 B2
(45) Date of Patent: Apr. 28, 2020

(54) TECHNOLOGIES FOR MEMORY MANAGEMENT OF NEURAL NETWORKS WITH SPARSE CONNECTIVITY

(71) Applicant: Intel Corporation, Santa Clara, CA (US)

(72) Inventors: Somnath Paul, Hillsboro, OR (US); Charles Augustine, Portland, OR (US); Muhammad M. Khellah, Tigard, OR (US); Sadique Ul Ameen Sheik, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 339 days.

(21) Appl. No.: 15/080,144

(22) Filed: Mar. 24, 2016

(65) Prior Publication Data
US 2017/0277628 A1    Sep. 28, 2017

(51) Int. Cl.
| | |
|---|---|
| G06F 12/06 | (2006.01) |
| G06N 3/063 | (2006.01) |
| G06N 3/04 | (2006.01) |
| G06F 12/02 | (2006.01) |
| G06F 11/20 | (2006.01) |
| G06F 16/22 | (2019.01) |
| G06F 11/30 | (2006.01) |
| G06F 12/00 | (2006.01) |

(52) U.S. Cl.
CPC ......... *G06N 3/063* (2013.01); *G06F 12/0292* (2013.01); *G06F 12/06* (2013.01); *G06N 3/049* (2013.01); *G06F 11/2017* (2013.01); *G06F 11/3037* (2013.01); *G06F 12/00* (2013.01); *G06F 16/2237* (2019.01); *G06F 2207/4824* (2013.01)

(58) Field of Classification Search
CPC .. G06F 12/023; G06F 2212/251; G06N 3/063
See application file for complete search history.

(56) References Cited

U.S. PATENT DOCUMENTS

| | | | | |
|---|---|---|---|---|
| 6,654,730 B1 * | 11/2003 | Kato | ...................... | G06N 3/063 706/15 |
| 2011/0289034 A1 * | 11/2011 | Palmer | ..................... | G06N 3/06 706/26 |
| 2012/0254087 A1 | 10/2012 | Visel | | |

(Continued)

OTHER PUBLICATIONS

P. Merolla, et al., "A million spiking-neuron integrated circuit with a scalable communication networks and interface," Science, vol. 345, No. 6197, pp. 668-673, Aug. 2014.

(Continued)

*Primary Examiner* — Reginald G Bragdon
*Assistant Examiner* — Edward Wang
(74) *Attorney, Agent, or Firm* — Barnes & Thornburg LLP

(57) ABSTRACT

Technologies for memory management of a neural network include a compute device to read a memory of the compute device to access connectivity data associated with a neuron of the neural network, determine a memory address at which weights corresponding with the one or more network connections are stored, and access the corresponding weights from a memory location corresponding with the memory address. The connectivity data is indicative of one or more network connections from the neuron.

21 Claims, 4 Drawing Sheets

(56) References Cited

U.S. PATENT DOCUMENTS

| | | |
|---|---|---|
| 2012/0323832 A1 | 12/2012 | Snook et al. |
| 2014/0172763 A1 | 6/2014 | Palmer et al. |
| 2015/0112911 A1* | 4/2015 | Jackson .................. G06N 3/04 706/29 |
| 2015/0242745 A1 | 8/2015 | Wang et al. |
| 2015/0324684 A1 | 11/2015 | Alvarez-Icaza Rivera et al. |
| 2016/0335534 A1* | 11/2016 | Nere ....................... G06N 3/049 |
| 2016/0358069 A1* | 12/2016 | Brothers ............. G06N 3/0454 |

OTHER PUBLICATIONS

J. Seo, et al., "A 45nm CMOS neuromorphic chip with a scalable architecture for learning in networks of spiking neurons," IEEE Custom Integrated Circuits Conference (CICC), Sep. 2011.

E. Chicca et al., "Memory and Information Processing in Neuromorphic Systems", Proceedings of the IEEE 102(9): 1367-1388 (2014).

"Sparse matrix", Mar. 2016, https://en.wikipedia.org/wiki/Sparse_matrix#Compressed_row_Storage_.28CRS_or_CSR.29.

"Lempel-Ziv-Welch", Mar. 2016, https://en.wikipedia.org/wiki/Lempel%E2%80%93Ziv%E2%80%93Welch.

International search report for PCT application No. PCT/US2017/018662, dated May 24, 2017 (3 pages).

Written opinion for PCT application No. PCT/US2017/018662, dated May 24, 2017 (7 pages).

\* cited by examiner

TECHNOLOGIES FOR MEMORY MANAGEMENT OF NEURAL NETWORKS WITH SPARSE CONNECTIVITY

BACKGROUND

Artificial neural networks are frequently used for the processing of various real-world stimuli such as, for example, image data, audio data, and/or other types of data (e.g., for pattern recognition). For example, in various embodiments, spiking neural networks and/or traditional Von-Neumann architecture may be utilized for such processing. Artificial neural networks typically include many neurons (or synapses) that are connected in various arrangements to one another and have weights assigned to each of the connections (e.g., denoting the significance of the connection). In many systems, each of those connection weights is stored separately in a synaptic weight memory. As such, neural networks with sparse connectivity often store many zero values in the synaptic weight memory.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
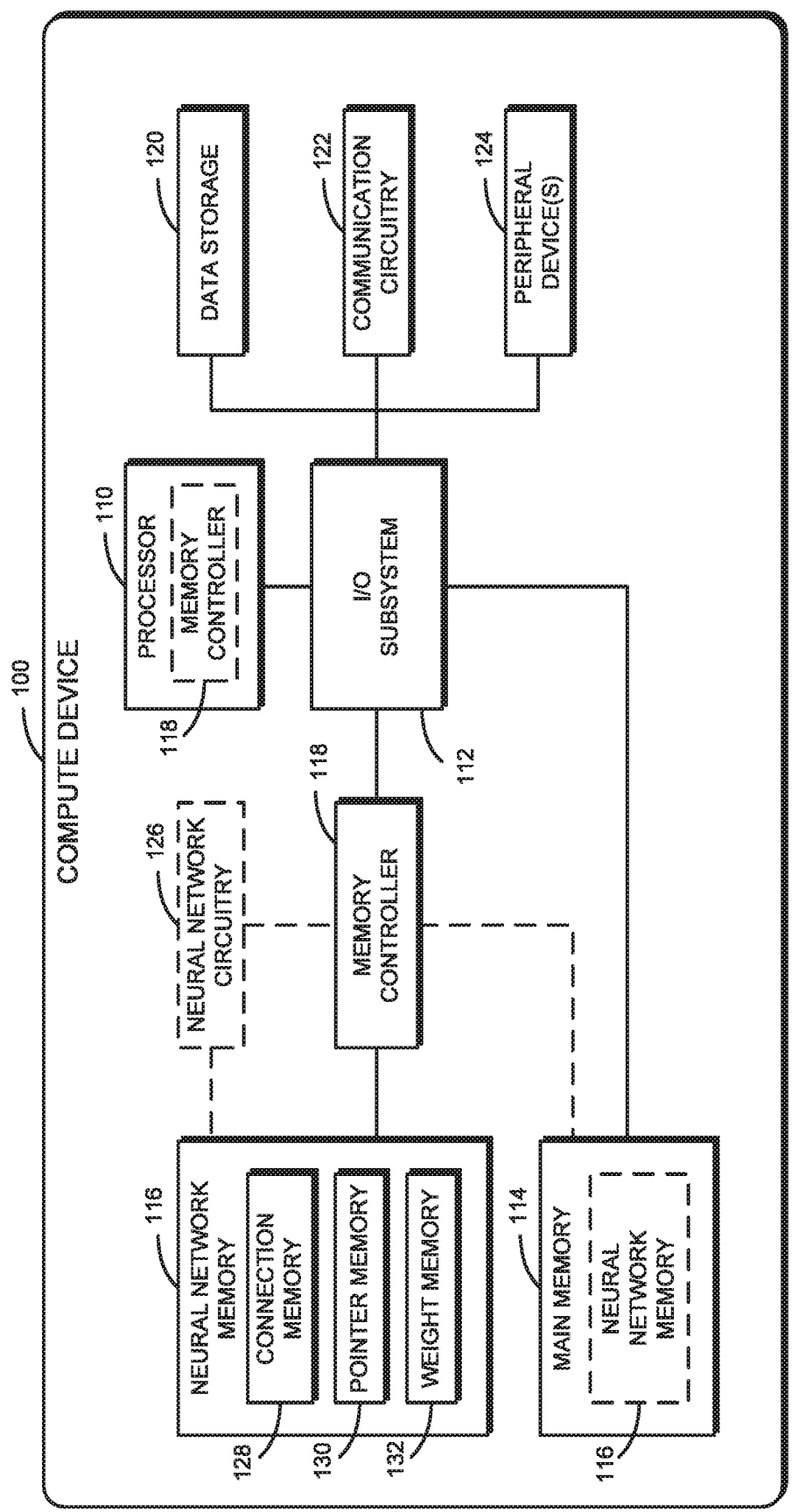
FIG. 1 is a simplified block diagram of at least one embodiment of a compute device for memory management of neural networks.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for memory management of neural networks is shown. As described in detail below, in the illustrative embodiment, the compute device 100 utilizes neural network memory 116 (e.g., a connection memory 128, a pointer memory 130, and a weight memory 132) to achieve a memory footprint for neural networks and/or other applications with data sparsity that is reduced relative to other memory management schemes. In particular, in some embodiments, the compute device 100 reads the connection memory 128 associated with a particular neuron/synapse to determine the neural network connections from that neuron (e.g., output connections) having nonzero weights and accesses the pointer memory 130 and the weight memory 132 to determine those weights. It should be appreciated that, in the illustrative embodiment, only nonzero weights are stored in the weight memory 132, for example, to reduce the memory footprint.

For example, in the illustrative embodiment, the memory storage scheme described herein involves storing $ipn*opn$ connectivity bits (e.g., in the connection memory 128), $ipn*opn*(i-j)*i$ bits for the weights (e.g., in the weight memory 132), and $ipn*\log_2(ipn*opn*(1-j)*i)$ bits for the pointer table (e.g., in the pointer memory 130) for a particular neuron's connection and weight data, where ipn is the number of input neurons, where opn is the number of output neurons, where i is the number of bits per synaptic weight, and where j defines the sparsity of the connection.

The compute device 100 may be embodied as any type of computing device capable of performing the functions described herein. For example, the compute device 100 may be embodied as a desktop computer, tablet computer, netbook, notebook, Ultrabook™, laptop computer, wearable computing device, smartphone, cellular phone, personal digital assistant, mobile Internet device, server, and/or any other mobile computing/communication device. As shown in FIG. 1, the illustrative compute device 100 includes a processor 110, an input/output ("I/O") subsystem 112, a main memory 114, a neural network memory 116, a memory controller 118, a data storage 120, a communication circuitry 122, and one or more peripheral devices 124. Additionally, in some embodiments, the compute device 100 may include a neural network circuitry 126. Of course, the compute device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the main memory 114, or portions thereof, may be incorporated in the processor 110 in some embodiments. Further, in some embodiments, the memory controller 118 may be incorporated in the processor 110 or the I/O subsystem 112.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the main memory 114 may be embodied as any type of volatile or non-volatile memory or data storage capable of performing the functions described herein. In operation, the main memory 114 may store various data and software used during operation of the compute device 100 such as operating systems, applications, programs, libraries, and drivers. The main memory 114 is communicatively coupled to the processor 110 via the I/O subsystem 112, which may be embodied as circuitry and/or components to facilitate input/output operations with the processor 110, the main memory 114, and other components of the compute device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the main memory 114, and other components of the compute device 100, on a single integrated circuit chip.

The neural network memory 116 may be embodied as any type of volatile or non-volatile memory or data storage capable of performing the functions described herein. The neural network memory 116 may store various data associated with the neural network connections, the connection weights, and/or other data associated with the functions described herein. Although the neural network memory 116 is shown as a separate component from the main memory 114 in the illustrative embodiment (e.g., a separate hardware component, a portion of a separate chipset, etc.), it should be appreciated that the neural network memory 116 may form a portion of the main memory 114 in some embodiments. For example, the neural network memory 116 may be embodied as one or more partitions of the main memory 114 in some embodiments.

As illustratively shown, the neural network memory 116 includes a connection memory 128, a pointer memory 130, and a weight memory 132. In some embodiments, the connection memory 128, the pointer memory 130, and/or the weight memory 132 may each form a portion (or entirety) of separate memory devices/components. In other embodiments, two or more of the connection memory 128, the pointer memory 130, and/or the weight memory 132 may form separate portions (e.g., partitions) of a common memory device, component, or circuitry (e.g., the main memory 114 and/or another memory device/component). It should be appreciated that, in some embodiments, the neural network memory 116, the connection memory 128, the pointer memory 130, and/or the weight memory 132 may be embodied as dense 1-read 1-write port 6T SRAM memory.

As described in further detail below, in the illustrative embodiment, the connection memory 128 is configured to store connectivity data for neurons of a neural network. The connectivity data for a particular neuron is indicative of the neural network connections from that neuron (e.g., output connections leaving that neuron). More specifically, in the illustrative embodiment, the connectivity data includes a bit sequence (i.e., of ones and zeroes) for each neuron that identifies which of the neural network connections have zero weight and which of the neural network connections have nonzero weight based on the associated bit value. It should be appreciated that the compute device 100 may identify the particular portion of the connection memory 128 and the pointer memory 130 to access/read based on the input neuron that spiked and the corresponding source address of that input neuron as described below.

In various embodiments, the compute device 100 may be powered, for example, by a battery, wireless charging, a renewable energy source (e.g., solar power), or when connected to a wall outlet (e.g., via an AC mains power source).

Figure 2:
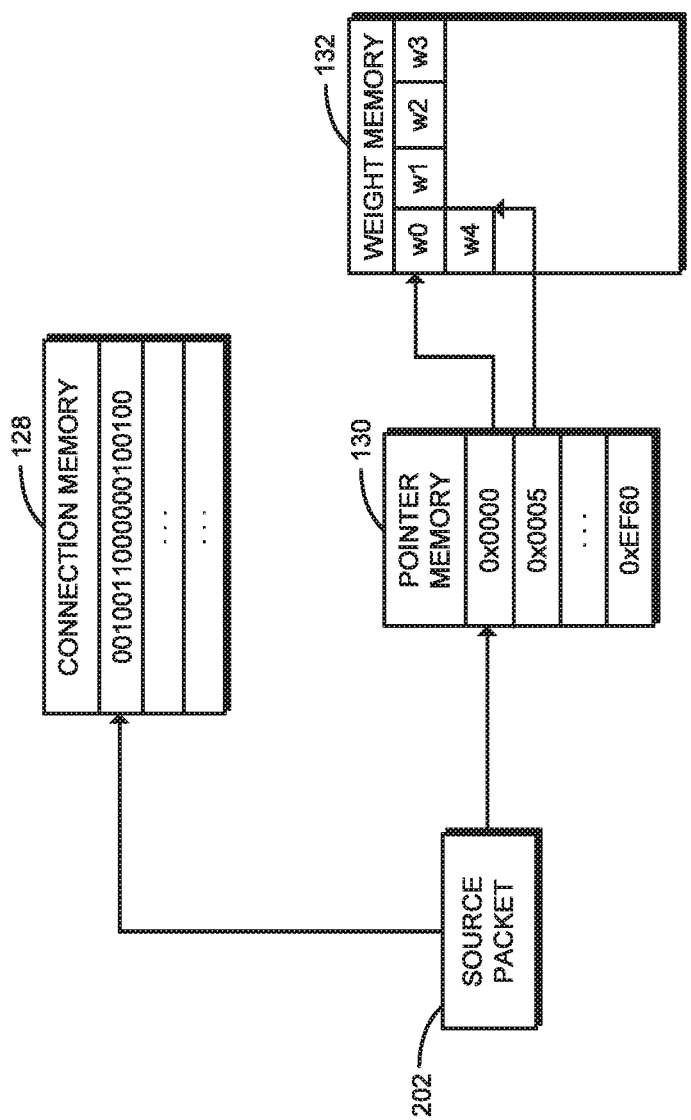
FIG. 2 is a simplified diagram of at least one embodiment of a memory management system of the compute device of FIG. 1.

As shown in the illustrative connection memory 128 of FIG. 2, a simplified bit sequence for a neuron that includes only twenty prospective connections (e.g., output neurons) may be stored in the connection memory 128 as "00010011000000100100." Assuming a counting scheme is employed such that the bit sequence begins with the zeroth bit and ends with the nineteenth bit, it should be appreciated that the connections to the third, sixth, seventh, fourteenth, and seventeenth neurons (i.e., the connections associated with a bit value of one) are associated with nonzero weights and the other connections have zero weight (e.g., the connections do not exist). As such, in the illustrative embodiment, a bit value of one is indicative of a nonzero weight and a bit value of zero is indicative of a zero weight of the corresponding prospective connection; however, in other embodiments, a bit value of one may be indicative of a zero weight and a bit value of zero may be indicative of a nonzero weight. In some embodiments, the compute device 100 may determine the number of connections associated with nonzero weights and, therefore, the number of nonzero weights stored in the weight memory 132 based on the number of bits in the bit sequence that identify such nonzero weighted connections (e.g., the number of ones in the bit sequence). It should be appreciated that the order of the corresponding connections (e.g., the order/numbering of the corresponding output neurons) may vary depending on the particular embodiment.

In the illustrative embodiment, the pointer memory 130 is configured to store one or more memory addresses at which the nonzero weights of the corresponding neural network connections are stored, and the weight memory 132 is configured to store those corresponding nonzero weights (see, for example, the weights w0, w1, w2, w3, and w4 shown as being stored in the illustrative weight memory 132 of FIG. 2). In particular, the pointer memory 130 may store a base address of a memory location of the weight memory 132 at which the first nonzero weight of the corresponding neural network connections is stored (see, for example, the pointer memory 130 of FIG. 2). In some embodiments, the pointer memory 130 may store only the base addresses of the weights for each of the neurons in the neural network. For example, as shown in the illustrative embodiment of FIG. 2, the memory address "0x0000" is the address of the first nonzero weight, w0, of the corresponding neuron (i.e., the base address of the corresponding nonzero weights for that neuron) and the memory address "0x0005" is the base address of corresponding nonzero weights for another neuron. It should be appreciated that, in the illustrative embodiment, the base address "0x0005" also defines the end of the last weight associated with the current neuron (i.e., the corresponding neuron described above). In some embodiments, the compute device 100 may utilize the base address of the corresponding nonzero weights in conjunction with the base address for the following neuron and/or the number of total nonzero weights determined based on the connectivity data to determine which data to access from the weight memory 132. For example, the weights w0 to w4 may be stored in memory addresses between the base address of the corresponding nonzero weights for that neuron (e.g., 0x0000) and an address immediately prior to the base address of corresponding nonzero weights for another neuron (e.g., the base address of corresponding nonzero weights for another neuron being 0x0005) and in an evenly spaced manner.

It should be appreciated that there may be a finite number of inputs (e.g., input neurons) at each core (e.g., of the processor 110). For example, a particular embodiment may have 1024 inputs, which may be labeled or identified as input 0 through input 1023. Each of those input neurons may have a corresponding source address (e.g., labeled 0 through 1023). As such, the neural network may process a source packet (e.g., the source packet 202 of FIG. 2) depending on the particular input that spiked at a particular point in time. As described below, in some embodiments, the source packet may be represented as an Address Event Representation (AES) data packet that is labeled or otherwise identifies the address corresponding with the spiked input. In the embodiment described herein, the connection memory 128 may include a corresponding number of stored bit sequences (e.g., 1024 sequences corresponding with the 1024 different inputs) and the pointer memory 130 may include a corresponding number of memory addresses at which the associated weights are stored in the weight memory 132 (e.g., 1024 addresses corresponding with the 1024 different inputs). As such, in the illustrative embodiment, for an input address of 5, the compute device 100 will access the $5^{th}$ location in the connection memory 128 and the $5^{th}$ location in the pointer memory 130. In other embodiments, however, the compute device 100 may associate the spiked neuron with the connection memory 128 and the pointer memory 130 in another suitable way.

In some embodiments, as the sparsity of the neural network changes, the neural network memory 116 may adapt to the exact memory space required. For example, in the illustrative embodiment, as the sparsity is increased, the actual used space on the weight memory 132 is reduced. Further, in some embodiments, a banked implementation of the weight memory 132 may be used to power-gate the unused sections, thereby reducing leakage power.

The memory controller 118 may be embodied as any component, device, and/or other circuitry capable of performing the functions described herein. In the illustrative embodiment, the memory controller 118 is configured to handle the management of the neural network memory 116 as described herein. Although the memory controller 118 is illustratively shown as an independent component, it should be appreciated that the memory controller 118 may form a portion of one or more other components in other embodiments. For example, in some embodiments, the memory controller 118 may form a portion of, or be co-located on the same die as, the processor 110. In other embodiments, the functions of the memory controller 118 may be performed by the processor 110, the I/O subsystem 112, and/or other component(s) of the compute device 100. In other words, in some embodiments, the memory controller 118 may be on the same die or integrated circuit as the processor 110 or memory 114, 116 or on a separate die or integrated circuit than those of the processor 110 and/or the memory 114, 116. Further, in some embodiments, the processor 110, the memory controller 118, and/or the memory 114, 116 may be implemented on a single die or integrated circuit.

The data storage 120 may be embodied as any type of device or devices configured for short-term or long-term storage of data such as, for example, memory devices and circuits, memory cards, hard disk drives, solid-state drives, or other data storage devices.

The communication circuitry 122 may be embodied as any communication circuit, device, or collection thereof, capable of enabling communications between the compute device 100 and other devices over a network. The communication circuitry 122 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 124 may include any number of additional peripheral or interface devices, such as speakers, microphones, additional storage devices, and so forth. The particular devices included in the peripheral devices 124 may depend on, for example, the type and/or intended use of the compute device 100.

As indicated above, in some embodiments, the compute device 100 may include a neural network circuitry 126 configured to perform one or more functions related to a neural network (e.g., pattern recognition). It should be appreciated that, in such embodiments, the neural network circuitry 126 may include various circuit elements/components (e.g., neuro-synaptic cores) to perform operations for the neural network. Although the neural network circuitry 126 is illustratively shown as an independent component in FIG. 1, it should be appreciated that the neural network circuitry 126 may form a portion of, or be integrated with, one or more other components of the compute device 100 in other embodiments.

Figure 3:
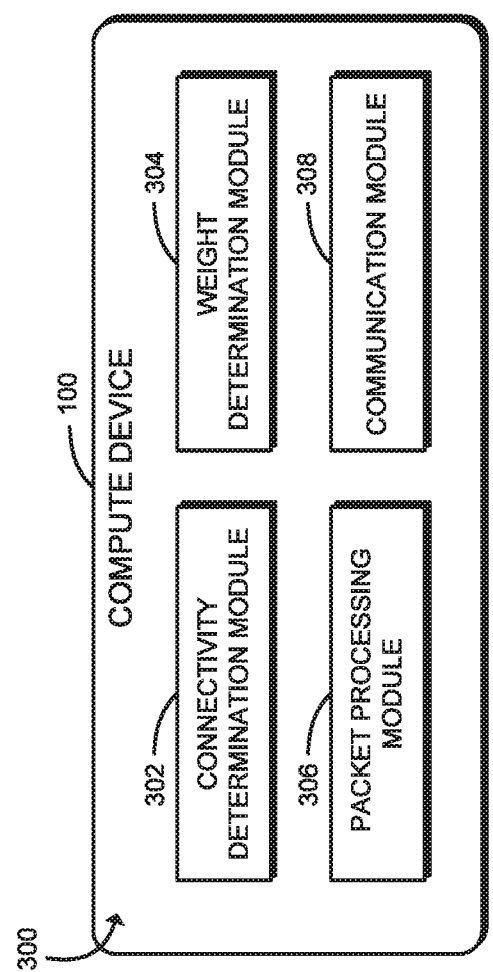
FIG. 3 is a simplified block diagram of at least one embodiment of an environment of a compute device of FIG. 1.

Referring now to FIG. 3, in use, the compute device 100 establishes an environment 300 for memory management of neural networks. The illustrative environment 300 includes a connectivity determination module 302, a weight determination module 304, a packet processing module 306, and a communication module 308. The various modules of the environment 300 may be embodied as hardware, software, firmware, or a combination thereof. For example, the various modules, logic, and other components of the environment 300 may form a portion of, or otherwise be established by, the processor 110, the memory controller 118, and/or other hardware components of the compute device 100. As such, in some embodiments, one or more of the modules of the environment 300 may be embodied as circuitry or collection of electrical devices (e.g., a connectivity determination circuitry, a weight determination circuitry, a packet processing circuitry, and/or a communication circuitry). Additionally, in some embodiments, one or more of the illustrative modules may form a portion of another module and/or one or more of the illustrative modules may be independent of one another.

The connectivity determination module 302 is configured to read the connection memory 128 to access stored connectivity data associated with a particular neuron/synapse. As described above, the connectivity data identifies the neural network connections from that neuron (e.g., output connections) and whether each of those network connections has a zero or nonzero weight. Further, in some embodiments, the connectivity determination module 302 may determine the total number of nonzero weights stored in the weight memory 132 for that particular neuron based on the connectivity data. For example, as indicated above, in some embodiments, the connectivity data for a particular neuron may be stored as a bit sequence that identifies which of the neural network connections have zero weight and which of the neural network connections have nonzero weight based on the associated bit value (e.g., such that a bit value of one represents a nonzero weight and a bit value of zero represents a zero weight).

The weight determination module 304 is configured to read/access the pointer memory 130 to determine the memory address of the weight memory 132 at which the nonzero weights of the corresponding neural network connections are stored. As such, the weight determination module 304 accesses/retrieves those weights from the corresponding memory location(s) of the weight memory 132. In some embodiments, the weight determination module 304 may retrieve the base address of those corresponding nonzero weights, which may be used to retrieve all of the nonzero weights for the corresponding neuron as described above. For example, the weight determination module 304 may access N weights stored at N consecutive memory locations of the weight memory 132 beginning with the base address, where N is the number of nonzero weights determined based on the connectivity data. In another embodiment, the weight determination module 304 may determine the base address of the nonzero weights associated with the neuron, read the subsequent memory address listed in the pointer memory 130, and read all of the weights stored between the base address and the subsequent memory address (e.g., the base address for the weights associated with the next neuron).

The packet processing module 306 is configured to receive a data packet (e.g., a source packet) for processing and/or to apply the neural network based on the determined weights for the various neural network connections. In some embodiments, the data packet may be received as an Address Event Representation (AES) data packet; however, the data packet may be represented in any other suitable format in other embodiments. It should be appreciated that, in some embodiments, the source packet may be received from another neuron via a neural connection (e.g., in a multi-tiered neural network), whereas in other embodiments the source packet may be received from a source input dataset or other suitable data source. In some embodiments, the packet processing module 306 may determine the memory locations of the connection memory 128 and the pointer memory 130 that correspond with various neurons. Further, in some embodiments, the packet processing module 306 may select the particular neurons to utilize based on the data type and/or other characteristics of the source data packet. As such, it should be appreciated that the packet processing module 306 may select the particular neurons and, therefore, the particular sets of connections and weights to use based on the data type and/or other characteristics of the source data packet.

The communication module 308 handles the communication between the compute device 100 and other computing devices. For example, in some embodiments, the compute device 100 may receive various data packets to process from a remote compute device and/or transmit the results of the neural network processing to a remote computing device.

Figure 4:
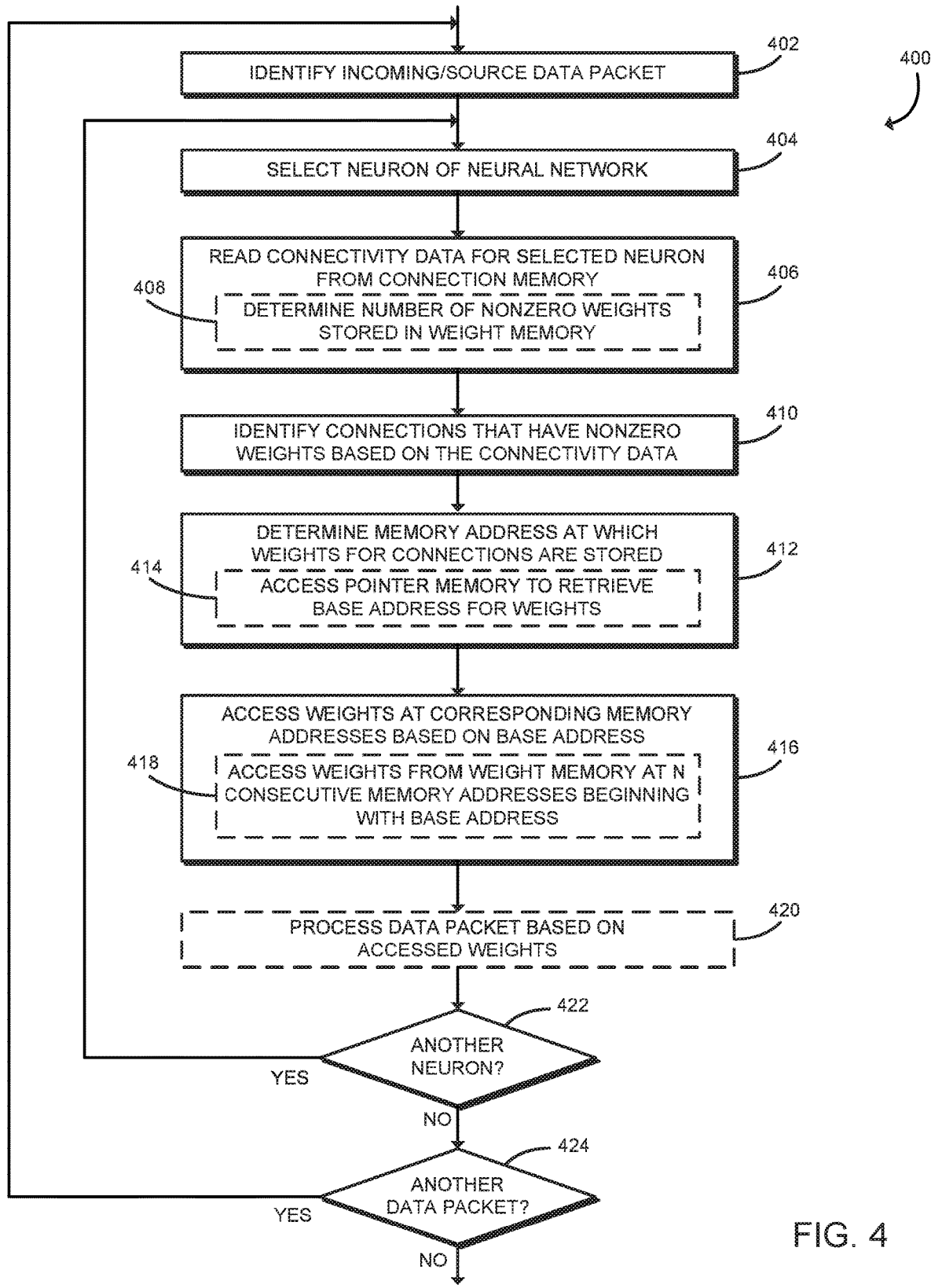
FIG. 4 is a simplified flow diagram of at least one embodiment of a method for memory management of a neural network that may be executed by the compute device of FIG. 1.

Referring now to FIG. 4, in use, the compute device may execute a method 400 for memory management of a neural network. The illustrative method 400 begins with block 402 in which the compute device 100 identifies an incoming/source data packet (e.g., an AER packet) to process with the neural network. In block 404, the compute device 100 selects a neuron of the neural network for which to receive the corresponding connection and weight data. As described above, in some embodiments, the compute device 100 may select which neurons (e.g., which neural network) to apply to the data packet based on one or more characteristics of that data packet (e.g., the data type). For example, in some embodiments, an audio file may be processed differently from an image file.

In block 406, the compute device 100 reads/accesses the connectivity data for the selected neuron from the connection memory 128. As described above, in the illustrative embodiment, the connectivity data identifies the neural network connections from the neuron (e.g., output connections) and whether each of those network connections has a zero or nonzero weight. As such, in block 408, the compute device 100 may determine the total number of nonzero weights stored in the weight memory 132 based on the connectivity data. As described below, in some embodiments, the total number of nonzero weights may be utilized in determining the number of consecutive memory locations to access to retrieve the corresponding weights from the weight memory 132.

In block 410, the compute device 100 identifies the connections that have nonzero weight based on the connectivity data. As indicative above, in the illustrative embodiment, the connectivity data for a particular neuron is stored as an ordered bit sequence with each possible output connection being assigned a particular bit of the bit sequence such that a bit value of one indicates the connection has a nonzero weight and a bit value of zero indicates that the connection has a zero weight. Accordingly, the compute device 100 may identify the connections having a bit value of one in the bit sequence as those that have nonzero weights. As indicated above, the order of the particular connections in the bit sequence may vary depending on the particular embodiment.

In block 412, the compute device 100 determines the memory address(es) at which the nonzero weights for the corresponding connections are stored. In doing so, in block 414, the compute device 100 may access the pointer memory 130 to determine the base address of the memory location of the weight memory 132 at which the corresponding weights are stored. In block 416, the compute device 100 accesses/retrieves the weights at the corresponding memory addresses based on the based address. In doing so, in block 418, the compute device 100 may access N weights stored at N consecutive memory locations of the weight memory 132 beginning with the base address, where N is the number of nonzero weights determined based on the connectivity data. For example, the five weights stored in the illustrative weight memory 132 of FIG. 2 may be accessed at the memory addresses "0x0000," "0x0001," "0x0002," "0x0003," "0x0004." Of course, the techniques described herein may be modified, for example, depending on the particular memory addressing scheme and/or naming convention. For example, if each of the five weights spanned multiple memory locations, the memory addresses accessed may be modified accordingly. In other embodiments, the compute device 100 may determine the base address of the nonzero weights associated with the input neuron, read the subsequent memory address listed in the pointer memory 130, and read all of the weights stored between the base address and the subsequent memory address (e.g., the base address for the weights associated with the next neuron). For example, in the illustrative embodiment of FIG. 4, the compute device 100 may read the first two entries of the pointer memory 130 ("0x0000" and "0x0005") and read the weights stored in the weight memory 132 between those memory locations but not including the weight associated with another neuron (i.e., "0x0000," "0x0001," "0x0002," "0x0003," "0x0004").

In block 420, the compute device 100 may process the data packet based on the accessed weights. Of course, in the illustrative embodiment, the connections not having weights stored in the weight memory 132 all have zero weights. In block 422, the compute device 100 determines whether to retrieve the corresponding connectivity and weight data for another neuron (e.g., to process on the incoming/source data packet). If so, the method 400 returns to block 404 in which the compute device 100 selects another neuron of the neural network. Otherwise, the method 400 advances to block 424 in which the compute device 100 determines whether another incoming/source data packet has been received to process. If so, the method 400 returns to block 402 in which compute device 100 may preprocess that data packet and/or otherwise determine which neurons and/or which neural network to apply to the data packet. It should be appreciated that one or more of the techniques describes herein may be performed contemporaneously with one another. For example, in some embodiments, the compute device 100 may execute the method 400 for multiple neurons and/or data packets simultaneously. Further, in some embodiments, the compute device 100 may access the connection memory 128 and the pointer memory 130 in parallel.

Reference to memory devices herein can apply to different memory types, and in particular, any memory that has a bank group architecture. Memory devices generally refer to volatile memory technologies. Volatile memory is memory whose state (and therefore the data stored on it) is indeterminate if power is interrupted to the device. Non-volatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, initial specification published in September 2012 by JEDEC), DDR4E (in development by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), and/or others, and technologies based on derivatives or extensions of such specifications.

The non-volatile memory may be embodied as any type of data storage capable of storing data in a persistent manner (even if power is interrupted to non-volatile memory). For example, in some embodiments, the non-volatile memory is embodied as one or more non-volatile memory devices. In some embodiments, the non-volatile memory devices of the non-volatile memory may be embodied as three-dimensional NAND ("3D NAND") non-volatile memory devices. However, in other embodiments, the non-volatile memory may be embodied as any combination of memory devices that use chalcogenide phase change material (e.g., chalcogenide glass), three-dimensional (3D) crosspoint memory, or other types of byte-addressable, write-in-place non-volatile memory, ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM.

In addition to, or alternatively to, volatile memory, in one embodiment, reference to memory devices can refer to a nonvolatile memory device whose state is determinate even if power is interrupted to the device.

EXAMPLES

Illustrative examples of the technologies disclosed herein are provided below. An embodiment of the technologies may include any one or more, and any combination of, the examples described below.

Example 1 includes a compute device for memory management of a neural network, the compute device comprising a memory; a connectivity determination module to read the memory to access connectivity data associated with a neuron of the neural network, wherein the connectivity data is indicative of one or more network connections from the neuron; and a weight determination module to (i) determine a memory address at which weights corresponding with the one or more network connections are stored and (ii) access the corresponding weights from a memory location corresponding with the memory address.

Example 2 includes the subject matter of Example 1, and wherein the connectivity data is indicative of one or more network connections from the neuron that correspond with nonzero weights.

Example 3 includes the subject matter of any of Examples 1 and 2, and further including a memory controller, wherein to read the memory comprises to read the memory by the memory controller.

Example 4 includes the subject matter of any of Examples 1-3, and wherein the memory comprises a connection memory and a pointer memory; wherein to read the memory of the compute device comprises to read the connection memory; and wherein to determine the memory address at which weights corresponding with the one or more network connections are stored comprises to read the pointer memory.

Example 5 includes the subject matter of any of Examples 1-4, and wherein the memory address stored at the pointer memory identifies a memory location of a weight memory at which the corresponding weights are stored.

Example 6 includes the subject matter of any of Examples 1-5, and wherein only nonzero weights are stored in the weight memory.

Example 7 includes the subject matter of any of Examples 1-6, and wherein the connectivity memory is indicative of a number, N, of nonzero weights stored in the weight memory and corresponding with the one or more network connections.

Example 8 includes the subject matter of any of Examples 1-7, and wherein to determine the memory address comprises to identify a base address of the weight memory at which a first weight of the corresponding weights is stored.

Example 9 includes the subject matter of any of Examples 1-8, and wherein to access the weights comprises to access N weights stored at N consecutive memory locations of the weight memory beginning with the base address.

Example 10 includes the subject matter of any of Examples 1-9, and wherein the connectivity data comprises a bit sequence indicative of the one or more network connections and the corresponding weights of the one or more network connections.

Example 11 includes the subject matter of any of Examples 1-10, and wherein the bit sequence includes one bit for each prospective network connection from the neuron; wherein a first bit value indicates that the weight corresponding with the corresponding prospective network connection is nonzero; and wherein a second bit value indicates that the corresponding prospective network connection does not exist.

Example 12 includes the subject matter of any of Examples 1-11, and wherein the first bit value is one and the second bit value is zero.

Example 13 includes the subject matter of any of Examples 1-12, and further including a packet processing module to process a data packet based on the one or more connections and the corresponding weights.

Example 14 includes the subject matter of any of Examples 1-13, and wherein to process the data packet comprises to process an Address Event Representation (AER) packet.

Example 15 includes the subject matter of any of Examples 1-14, and further comprising a processor and any of: a display communicatively coupled to the processor; a network interface communicatively coupled to the processor; or a battery coupled to provide power at least to the processor.

Example 16 includes a method for memory management of a neural network by a compute device, the method comprising reading, by the compute device, a memory of the compute device to access connectivity data associated with a neuron of the neural network, wherein the connectivity data is indicative of one or more network connections from the neuron; determining, by the compute device, a memory address at which weights corresponding with the one or more network connections are stored; and accessing, by the compute device, the corresponding weights from a memory location corresponding with the memory address.

Example 17 includes the subject matter of Example 16, and wherein the connectivity data is indicative of one or more network connections from the neuron that correspond with nonzero weights.

Example 18 includes the subject matter of any of Examples 16 and 17, and wherein reading the memory comprises reading the memory with a memory controller of the compute device.

Example 19 includes the subject matter of any of Examples 16-18, and wherein reading the memory of the compute device comprises reading a connection memory of the compute device; and wherein determining the memory address at which weights corresponding with the one or more network connections are stored comprises reading a pointer memory different from the connection memory.

Example 20 includes the subject matter of any of Examples 16-19, and wherein the memory address stored at the pointer memory identifies a memory location of a weight memory at which the corresponding weights are stored.

Example 21 includes the subject matter of any of Examples 16-20, and wherein only nonzero weights are stored in the weight memory.

Example 22 includes the subject matter of any of Examples 16-21, and wherein the connectivity memory is indicative of a number, N, of nonzero weights stored in the weight memory and corresponding with the one or more network connections.

Example 23 includes the subject matter of any of Examples 16-22, and wherein determining the memory address comprises identifying a base address of the weight memory at which a first weight of the corresponding weights is stored.

Example 24 includes the subject matter of any of Examples 16-23, and wherein accessing the weights comprises accessing N weights stored at N consecutive memory locations of the weight memory beginning with the base address.

Example 25 includes the subject matter of any of Examples 16-24, and wherein the connectivity data comprises a bit sequence indicative of the one or more network connections and the corresponding weights of the one or more network connections.

Example 26 includes the subject matter of any of Examples 16-25, and wherein the bit sequence includes one bit for each prospective network connection from the neuron; wherein a first bit value indicates that the weight corresponding with the corresponding prospective network connection is nonzero; and wherein a second bit value indicates that the corresponding prospective network connection does not exist.

Example 27 includes the subject matter of any of Examples 16-26, and wherein the first bit value is one and the second bit value is zero.

Example 28 includes the subject matter of any of Examples 16-27, and further including processing a data packet based on the one or more connections and the corresponding weights.

Example 29 includes the subject matter of any of Examples 16-28, and wherein processing the data packet comprises processing an Address Event Representation (AER) packet.

Example 30 includes a computing device comprising a processor; and a memory having stored therein a plurality of instructions that when executed by the processor cause the computing device to perform the method of any of Examples 16-29.

Example 31 includes one or more machine-readable storage media comprising a plurality of instructions stored thereon that in response to being executed result in a computing device performing the method of any of Examples 16-29.

Example 32 includes a computing device comprising means for performing the method of any of Examples 16-29.

Example 33 includes a compute device for memory management of a neural network, the compute device comprising means for reading a memory of the compute device to access connectivity data associated with a neuron of the neural network, wherein the connectivity data is indicative of one or more network connections from the neuron; means for determining a memory address at which weights corresponding with the one or more network connections are stored; and means for means for accessing the corresponding weights from a memory location corresponding with the memory address.

Example 34 includes the subject matter of Example 33, and wherein the connectivity data is indicative of one or more network connections from the neuron that correspond with nonzero weights.

Example 35 includes the subject matter of any of Examples 33 and 34, and wherein the means for reading the memory comprises means for reading the memory with a memory controller of the compute device.

Example 36 includes the subject matter of any of Examples 33-35, and wherein the means for reading the memory of the compute device comprises means for reading a connection memory of the compute device; and wherein the means for determining the memory address at which weights corresponding with the one or more network connections are stored comprises means for reading a pointer memory different from the connection memory.

Example 37 includes the subject matter of any of Examples 33-36, and wherein the memory address stored at the pointer memory identifies a memory location of a weight memory at which the corresponding weights are stored.

Example 38 includes the subject matter of any of Examples 33-37, and wherein only nonzero weights are stored in the weight memory.

Example 39 includes the subject matter of any of Examples 33-38, and wherein the connectivity memory is indicative of a number, N, of nonzero weights stored in the weight memory and corresponding with the one or more network connections.

Example 40 includes the subject matter of any of Examples 33-39, and wherein the means for determining the memory address comprises means for identifying a base address of the weight memory at which a first weight of the corresponding weights is stored.

Example 41 includes the subject matter of any of Examples 33-40, and wherein the means for accessing the weights comprises means for accessing N weights stored at N consecutive memory locations of the weight memory beginning with the base address.

Example 42 includes the subject matter of any of Examples 33-41, and wherein the connectivity data comprises a bit sequence indicative of the one or more network connections and the corresponding weights of the one or more network connections.

Example 43 includes the subject matter of any of Examples 33-42, and wherein the bit sequence includes one bit for each prospective network connection from the neuron; wherein a first bit value indicates that the weight corresponding with the corresponding prospective network connection is nonzero; and wherein a second bit value indicates that the corresponding prospective network connection does not exist.

Example 44 includes the subject matter of any of Examples 33-43, and wherein the first bit value is one and the second bit value is zero.

Example 45 includes the subject matter of any of Examples 33-44, and further including means for processing a data packet based on the one or more connections and the corresponding weights.

Example 46 includes the subject matter of any of Examples 33-45, and wherein the means for processing the data packet comprises means for processing an Address Event Representation (AER) packet.

The invention claimed is:

1. A compute device for memory management of a neural network, the compute device comprising:
a memory comprising connectivity data associated with a first neuron of the neural network, wherein the first neuron is associated with a plurality of input neurons and a plurality of output neurons, wherein the connectivity data comprises a bit sequence indicating which of a plurality of network connections to the plurality of output neurons have a non-zero weight and which of the plurality of network connections to the plurality of output neurons have a zero weight;
a packet processing module to:
receive a data packet from a second neuron, wherein the second neuron is one of the plurality of input neurons;
determine that the data packet indicates a spike from the second neuron as an input to the first neuron;
a connectivity determination module to read the memory to access the connectivity data associated with the first neuron of the neural network in response to a determination that the data packet indicates a spike from the second neuron as an input to the first neuron; and
a weight determination module to (i) determine, for each of the plurality of network connections to the plurality of output neurons that have a non-zero weight, a memory address at which the corresponding non-zero weight is stored and (ii) access, for each of the plurality of network connections to the plurality of output neurons that have a non-zero weight, the corresponding non-zero weight from a memory location corresponding with the corresponding memory address,
wherein the packet processing module processes the data packet based on the weight of the plurality of network connections to the plurality of output neurons that have a non-zero weight, and wherein the weights of the plurality of network connections to the plurality of output neurons that have a zero weight are not directly stored in the memory.

2. The compute device of claim 1, further comprising a memory controller, wherein to read the memory comprises to read the memory by the memory controller.

3. The compute device of claim 1, wherein the memory comprises a connection memory and a pointer memory;
wherein to read the memory of the compute device comprises to read the connection memory; and
wherein to determine the memory address at which the corresponding non-zero weight[s] is stored comprises to read the pointer memory.

4. The compute device of claim 3, wherein the memory address stored at the pointer memory identifies a memory location of a weight memory at which the corresponding weights are stored.

5. The compute device of claim 4, wherein only nonzero weights are stored in the weight memory.

6. The compute device of claim 4, wherein the connectivity memory is indicative of a number, N, of nonzero weights stored in the weight memory that correspond with the plurality of network connections to the plurality of output neurons that have a non-zero weight,
wherein the connectivity memory is indicative of a number, M, of zero weights that are not stored in the weight memory.

7. The compute device of claim 6, wherein to determine the memory address comprises to identify a base address of the weight memory at which a first weight of the corresponding weights is stored.

8. The compute device of claim 7, wherein to access for each of the plurality of network connections to the plurality of output neurons having a non-zero weight, the corresponding non-zero weight comprises to access N weights stored at N consecutive memory locations of the weight memory beginning with the base address.

9. The compute device of claim 1, wherein the bit sequence includes one bit for each prospective network connection from the neuron;
wherein a first bit value indicates that the weight corresponding with the corresponding prospective network connection is nonzero and that the weight corresponding with the corresponding prospective network connection is stored in the memory; and
wherein a second bit value indicates that the corresponding prospective network connection does not exist and that the weight corresponding with the corresponding prospective network connection is not stored in the memory.

10. The compute device of claim 1, wherein the data packet is an Address Event Representation (AER) packet.

11. The compute device of claim 1, further comprising a processor and any of: a display communicatively coupled to the processor; a network interface communicatively coupled to the processor; or a battery coupled to provide power at least to the processor.

12. One or more non-transitory machine-readable storage media comprising a plurality of instructions stored thereon that, in response to execution by a compute device, cause the compute device to:
receive a data packet;
determine that the data packet indicates a spike input to a first neuron from a second neuron, wherein the first neuron is associated with a plurality of input neurons and a plurality of output neurons;
read a memory of the compute device to access connectivity data associated with the first neuron of the neural network in response to a determination that the data packet indicates a spike from the second neuron as an input to the first neuron, wherein the connectivity data comprises a bit sequence indicating which of a plurality of network connections to the plurality of output neurons have a non-zero weight and which of the plurality of network connections to the plurality of output neurons have a zero weight;
determine, for each of the plurality of network connections to the plurality of output neurons that have a non-zero weight, a memory address at which the corresponding non-zero weight is stored;
access, for each of the plurality of network connections to the plurality of output neurons that have a non-zero weight, the corresponding non-zero weight from a memory location corresponding with the corresponding memory address; and
process the data packet based on the weight of the plurality of network connections to the plurality of output neurons that have a non-zero weight, wherein the weights of the plurality of network connections to the plurality of output neurons that have a zero weight are not directly stored in the memory.

13. The one or more non-transitory machine-readable storage media of claim 12, wherein to read the memory of the compute device comprises to read a connection memory of the compute device; and
wherein to determine the memory address at which the corresponding non-zero weight is stored comprises to read a pointer memory different from the connection memory.

14. The one or more non-transitory machine-readable storage media of claim 13, wherein the memory address stored at the pointer memory identifies a memory location of a weight memory at which the corresponding weights are stored; and
wherein only nonzero weights are stored in the weight memory.

15. The one or more non-transitory machine-readable storage media of claim 14, wherein the connectivity memory is indicative of a number, N, of nonzero weights stored in the weight memory that correspond with the plurality of network connections to the plurality of output neurons that have a non-zero weight;
wherein to determine the memory address comprises to identify a base address of the weight memory at which a first weight of the corresponding weight is stored; and
wherein to access the weights comprises to access N weights stored at N consecutive memory locations of the weight memory beginning with the base address.

16. The one or more non-transitory machine-readable storage media of claim 12,
wherein the bit sequence includes one bit for each prospective network connection from the neuron;
wherein a first bit value indicates that the weight corresponding with the corresponding prospective network connection is nonzero and that the weight corresponding with the corresponding prospective network connection is stored in the memory; and
wherein a second bit value indicates that the corresponding prospective network connection does not exist and that the weight corresponding with the corresponding prospective network connection is not stored in the memory.

17. A method for memory management of a neural network by a compute device, the method comprising:
receiving, by the compute device, a data packet;
determining, by the compute device, that the data packet indicates a spike input to a first neuron from a second neuron, wherein the first neuron is associated with a plurality of input neurons and a plurality of output neurons;
reading, by the compute device, a memory of the compute device to access connectivity data associated with the first neuron of the neural network in response to a determination that the data packet indicates a spike from the second neuron as an input to the first neuron, wherein the connectivity data comprises a bit sequence indicating which of a plurality of network connections to the plurality of output neurons have a non-zero weight and which of the plurality of network connections to the plurality of output neurons have a zero weight;
determining, by the compute device and for each of the plurality of network connections to the plurality of output neurons that have a non-zero weight, a memory address at which the corresponding non-zero weight is stored;
accessing, by the compute device and for each of the plurality of network connections to the plurality of output neurons that have a non-zero weight, the corresponding non-zero weight from a memory location corresponding with the corresponding memory address;
processing the data packet based on the weight of the plurality of network connections to the plurality of output neurons that have a non-zero weight, wherein the weights of the plurality of network connections to the plurality of output neurons that have a zero weight are not directly stored in the memory.

18. The method of claim 17, wherein reading the memory of the compute device comprises reading a connection memory of the compute device; and wherein determining the memory address at which the corresponding non-zero weight is stored comprises reading a pointer memory different from the connection memory.

19. The method of claim 18, wherein the memory address stored at the pointer memory identifies a memory location of a weight memory at which the corresponding weights are stored; and wherein only nonzero weights are stored in the weight memory.

20. The method of claim 19, wherein determining the memory address comprises identifying a base address of the weight memory at which a first weight of the corresponding weights is stored; and wherein accessing the weights comprises accessing N weights stored at N consecutive memory locations of the weight memory beginning with the base address.

21. The method of claim 17, wherein the bit sequence includes one bit for each prospective network connection from the neuron;

wherein a first bit value indicates that the weight corresponding with the corresponding prospective network connection is nonzero and that the weight corresponding with the corresponding prospective network connection is stored in the memory; and wherein a second bit value indicates that the corresponding prospective network connection does not exist and that the weight corresponding with the corresponding prospective network connection is not stored in the memory.

\* \* \* \* \*